United States Patent
Ahlin

(10) Patent No.: US 10,065,115 B2
(45) Date of Patent: Sep. 4, 2018

(54) GENERATION OF AN INSTANT VIRTUAL REENACTMENT OF AN OCCURRING EVENT

(71) Applicant: Sony Mobile Communications Inc., Tokyo (JP)

(72) Inventor: Eskil Ahlin, Veberöd (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 629 days.

(21) Appl. No.: 14/523,367

(22) Filed: Oct. 24, 2014

(65) Prior Publication Data

US 2015/0119141 A1   Apr. 30, 2015

Related U.S. Application Data

(63) Continuation-in-part of application No. PCT/IB2013/002422, filed on Oct. 31, 2013.

(51) Int. Cl.
| | | |
|---|---|---|
| A63F 13/00 | (2014.01) | |
| A63F 13/497 | (2014.01) | |
| A63F 13/65 | (2014.01) | |
| A63F 13/40 | (2014.01) | |
| A63F 13/30 | (2014.01) | |

(52) U.S. Cl.
CPC ............ *A63F 13/497* (2014.09); *A63F 13/10* (2013.01); *A63F 13/12* (2013.01); *A63F 13/65* (2014.09); *A63F 2300/577* (2013.01); *A63F 2300/634* (2013.01); *A63F 2300/69* (2013.01)

(58) Field of Classification Search
CPC ... H04L 67/38; H04L 29/06034; G06F 9/542; G06K 9/00724; G06T 19/006; H04N 21/2187; H04N 21/4781; H04N 7/181; A63B 2024/0025; A63B 2071/0647; A63B 2102/18; A63B 2243/0025; A63B 2243/0037; A63B 2243/0066; A63B 24/0021; A63B 24/0084; A63B 71/02

See application file for complete search history.

(56) References Cited

U.S. PATENT DOCUMENTS

| | | | | |
|---|---|---|---|---|
| 6,080,063 A | * | 6/2000 | Khosla | ............... A63F 13/10 463/42 |
| 6,483,511 B1 | * | 11/2002 | Snyder | ............... A63F 13/10 345/473 |
| 2001/0003715 A1 | * | 6/2001 | Jutzi | ............... A63F 13/12 463/40 |

(Continued)

FOREIGN PATENT DOCUMENTS

| | | |
|---|---|---|
| EP | 0773514 A1 | 5/1997 |
| WO | 9846029 A1 | 10/1998 |
| WO | 03051050 A1 | 6/2003 |

OTHER PUBLICATIONS

International Search Report issued in corresponding PCT Application No. PCT/IB2013/002422 dated Apr. 15, 2014, 4 pages.

*Primary Examiner* — Lawrence Galka
(74) *Attorney, Agent, or Firm* — Tucker Ellis LLP

(57) ABSTRACT

A method for generating an instant virtual reenactment of an occurring event and an electronic device for generating an instant virtual reenactment of an occurring event comprising a processing unit, a thereto connected storage unit, at least one remote control, and a network communication device.

14 Claims, 2 Drawing Sheets

(56) References Cited

U.S. PATENT DOCUMENTS

| | | | | |
|---|---|---|---|---|
| 2004/0135677 A1* | 7/2004 | Asam | ............ | A63F 13/12 |
| | | | | 340/425.5 |
| 2005/0130725 A1* | 6/2005 | Creamer | ............ | A63F 13/10 |
| | | | | 463/1 |
| 2005/0148388 A1* | 7/2005 | Vayra | ............ | A63F 13/10 |
| | | | | 463/32 |
| 2007/0005704 A1* | 1/2007 | Heron | ............ | H04L 12/1818 |
| | | | | 709/206 |
| 2007/0296723 A1* | 12/2007 | Williams | ............ | A63F 13/12 |
| | | | | 345/473 |
| 2009/0189982 A1* | 7/2009 | Tawiah | ............ | A63B 24/0006 |
| | | | | 348/157 |
| 2010/0271367 A1* | 10/2010 | Vaden | ............ | G06T 19/006 |
| | | | | 345/420 |
| 2010/0331065 A1* | 12/2010 | Hormigo Cebolla | ... | A63F 13/02 |
| | | | | 463/4 |
| 2011/0281645 A1 | 11/2011 | Wolfson et al. | | |

\* cited by examiner

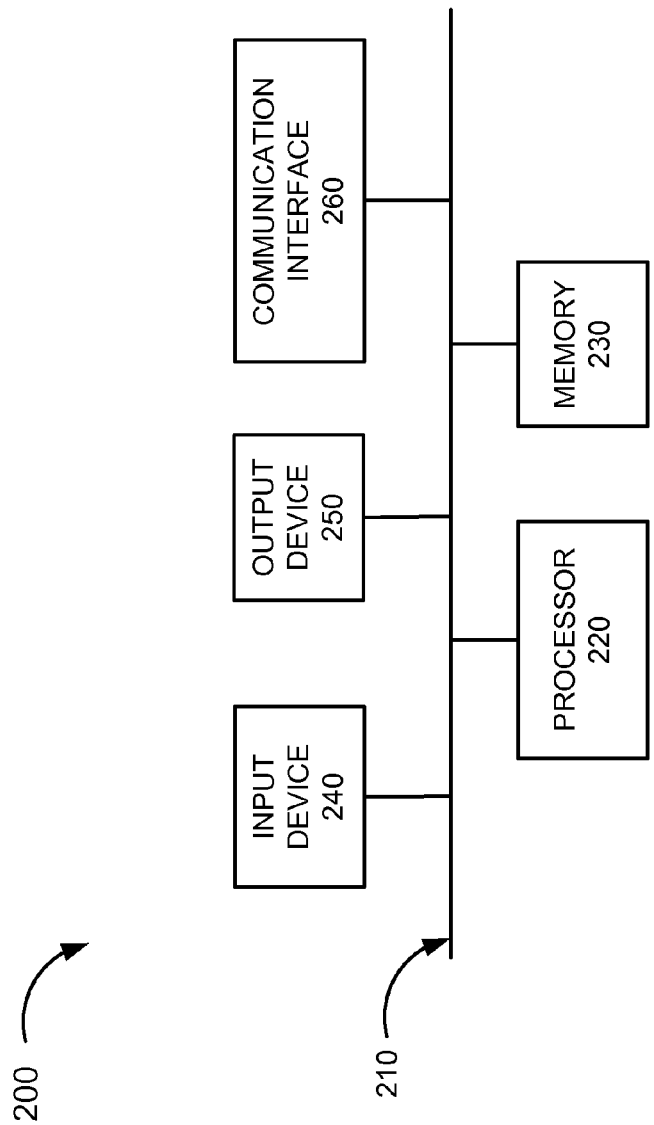

GENERATION OF AN INSTANT VIRTUAL REENACTMENT OF AN OCCURRING EVENT

CROSS REFERENCE TO RELATED APPLICATION

This application is a continuation-in-part of International Application No. PCT/IB2013/002422, filed Oct. 31, 2013, the disclosure of which is hereby incorporated herein by reference.

TECHNICAL FIELD

The present invention relates to generating an instant virtual reenactment of an occurring event and an electronic device for generating a virtual reenactment of an occurring event.

BACKGROUND ART

For a number of years, there has been a large interest in development of increasingly more realistic games in which e.g. historic events, sport events etc., are reenacted virtually by a user. The games are generally arranged such that a historical event is recreated by a game creator and the user is able to control a playable character throughout the game.

However, since more and more people are following different types of sports events on live broadcasts e.g. via satellite, the internet etc., and have access to electronic devices such as computers, gaming consoles and mobile phones, there has been an increasing demand for the ability to instantly generate a virtual reenactment of particular situations in such events e.g. when a goal is scored or missed in a soccer game.

SUMMARY OF THE INVENTION

The present invention provides a method and an electronic device that enables instant generation of a virtual reenactment of an occurring event.

With the above description in mind, then, an aspect of the present invention is to provide a method and an electronic device that enables instant generation of a virtual reenactment of an occurring event. These and further aspects are achieved by a method for generating an instant virtual reenactment of an occurring event. In one aspect, the method may comprise the step of receiving, in an electronic device, at least one continuous data stream with information regarding objects in the occurring event. The method may further comprise the step of switching to a reenactment mode in said electronic device, and the step of associating virtual, computer generated objects with information from the at least one data stream regarding the occurring event in order to recreate a particular situation in said event such that a reenactment of said situation by at least one user can be performed. The method may also further comprise the step of allowing at least one user to control the virtual objects to reenact said situation. By providing a method for generating a virtual reenactment of an occurring event, a way of instantly associating objects in the virtual reenactment with information from the occurring event is provided to allow the user(s) to reenact a particular situation without delay.

According to one aspect of the disclosure, it provides a method for storing information in real time from said at least one data stream with information regarding the occurring event in a storage unit connected to said electronic device wherein the information is stored for a predetermined period of time. By providing a method for storing the information from said data stream, the user(s) is able to track backwards in time in the occurring event to the position when the particular situation started to evolve and thereby giving the user the chance to reenact the situation from the beginning. Furthermore, by storing the at least one data stream for a predetermined time, e.g. a maximum of 1-2 minutes, the stored data is kept at a minimum and only occupies a small part of the storage unit.

According to a further aspect of the disclosure, it provides a method for associating virtual, computer generated objects with information from the at least one data stream wherein the information from the at least one continuous data stream comprises spatial and velocity information regarding the objects in the occurring event. By providing a method for associating the computer generated objects in the virtual reenactment with spatial and velocity information from the at least one continuous data stream, any situation that has occurred can be reenacted with greater accuracy. The velocity information may comprise movement direction and velocity for the objects in the occurring event. The user(s) can also choose which object in the reenactment to control and the other objects can be controlled according to the corresponding spatial and velocity information from the at least one data stream.

According to another aspect of the disclosure, it provides a method for associating virtual, computer generated objects with information from the at least one data stream, wherein the information from the at least one continuous data stream comprises image information of the occurring event. By providing a method for associating the computer generated objects in the virtual reenactment with image information from the at least one continuous data stream, the occurring event can be recreated in higher detail. Through image analysis, the objects in the reenactment can be placed by creating an environment that reflect that stored in the image information in the at least one data stream. This also allows the electronic device to display the occurring event on a display and furthermore to separate a second data stream comprising spatial and velocity information regarding objects in the occurring event from the first data stream only comprising image information by utilizing tracking of objects i.e. a player tracking system in the moving image. The second data stream comprising spatial and velocity information regarding objects in the occurring event can then be used according to the above to generate an instant virtual reenactment of the occurring event.

According to yet another aspect of the disclosure, it provides a method for receiving at least two continuous data streams, wherein the information from a first data stream of the at least two continuous data streams comprises image information and the information from a second data stream of the at least two continuous data streams comprises spatial and velocity information, wherein the data stream comprising image information and the data stream comprising spatial and velocity information are synchronized and at least the data stream comprising spatial and velocity information is stored in the storage unit connected to the electronic device, wherein the velocity information may comprise movement direction and velocity for the objects in the occurring event. By providing a method in which the two data streams are synchronized, a user(s) can instantly switch to a reenactment mode and the electronic device can thereby automatically determine the particular situation to reenact. Furthermore, the image information and the spatial and velocity information can, when the data streams are synchronized, be applied to the virtual reenactment simultaneously to enhance the accuracy of the generation.

According to another aspect of the disclosure, it provides a method for associating virtual, computer generated objects with spatial information from the at least one data stream, wherein the spatial and velocity information comprises position coordinates for each object e.g. in a three dimensional coordinate system and/or each objects movement direction and/or velocities of each object in the occurring event. By providing a method for associating the computer generated objects in the virtual reenactment with position coordinates for each object e.g. in a three dimensional coordinate system and/or each objects movement direction and/or velocities of each object in the occurring event, any situation that has occurred can be reenacted with greater accuracy.

According to yet another aspect of the disclosure, it provides a method for defining a common coordinate system that is shared between a virtual reenactment environment and the environment in the occurring event, to be used as reference for applying the spatial and velocity information from the occurring event to the objects in the virtual environment. By providing a method for sharing a coordinate system between the virtual reenactment and the occurring event, the reenactment can be generated with higher accuracy. The reenactment can also be made more universal, i.e. if the position of the objects in the occurring event is determined according to a coordinate system with predetermined placement e.g. the center of the field with predetermined axis orientations, the object positions can be applied to any virtual location by placing the objects according to a corresponding coordinate system. For example, if a soccer game is played in a small local arena, the user(s) can choose to reenact a situation from that game at another virtual arena with the players placed accurately.

According to yet another aspect of the disclosure, it provides a method for switching to a reenactment mode in said electronic device, wherein the switching is performed by a user engaging a reenactment activator on either of the electronic device or a remote control device connected to the electronic device. By providing a method for switching to a reenactment mode by using a reenactment activator, the user is able to switch in a simple way to a reenactment mode at a desired time by a single action.

According to yet another aspect of the disclosure, it provides a method for switching to a reenactment mode in said electronic device, wherein the switching is performed by a first user, that is watching an occurring event, sends a reenactment request to at least one other remote user, and if the request is accepted by the other user(s), the information regarding the occurring event that is stored in the storage unit of the first user is transmitted to the electronic device of the other user(s) for enabling simultaneous reenactment of an occurring event by at least two remote users. By providing a method for sending a reenactment request to another user(s), a fast and efficient way of creating a shared reenactment that can be controlled by several users simultaneously is provided. The transmitted information regarding the occurring event can comprise spatial and velocity information regarding the objects in the occurring event, making the total amount of data transmitted small. This has the benefit of short waiting times for the user(s) while still maintaining the accuracy in the object placement. Alternatively, according to another aspect of the invention, the transmitted total amount of data may also be decreased by sending a compressed text file instead of any audio and/or video file/information. Then, the text file at least or only specifies, as an example, the position of the players and the ball. Hence, any computer graphics and/or sound information may be locally stored and "filled-in" by the electronic device, e.g. a game pad, to complement the information in the text file and enabling the simultaneous reenactment of the associated occurring event by the at least two remote users. This is similar to sending metadata concerning the players and the ball in this event. This has the benefit of short waiting times for the user(s), even no delay, while still maintaining the accuracy in the object placement.

The above and further aspects are also achieved by an electronic device for generating an instant virtual reenactment of an occurring event comprising a processing unit, a thereto connected storage unit, at least one remote control, and a network communication device. The electronic device is configured for receiving at least one continuous data stream with information regarding objects in the occurring event; and switching to a reenactment mode in said electronic device; and associating virtual, computer generated objects with information from the at least one data stream with information regarding the occurring event to recreate a particular situation in said event for reenactment of said situation by a user; and controlling of the virtual objects by at least one user to reenact said situation.

The above are also achieved by below aspects of the invention, and further aspects and features will appear from the following detailed description of aspects of the invention.

According to another aspect of the disclosure, it provides an electronic device that can be any of a mobile electronic device, a gaming device or a computer.

According to yet another aspect of the disclosure, it provides an electronic device wherein the electronic device is configured to store information in real time from said at least one data stream with information regarding the occurring event in the storage unit connected to said electronic device wherein the information is stored for a predetermined period of time.

According to a further aspect of the disclosure, it provides an electronic device wherein the electronic device is configured to associate virtual, computer generated objects with information from the at least one data stream wherein the information from the at least one continuous data stream comprises spatial and velocity information regarding the objects in the occurring event.

According to a further aspect of the disclosure, it provides an electronic device wherein the electronic device is configured to receive at least two continuous data streams, wherein the information from a first data stream of the at least two continuous data streams comprises image information and the information from a second data stream of the at least two continuous data streams comprises spatial and velocity information, wherein the data stream comprising image information and the data stream comprising spatial and velocity information are synchronized and at least the data stream comprising spatial and velocity information is stored in the storage unit connected to the electronic device.

According to a further aspect of the disclosure, it provides an electronic device wherein the electronic device is configured to define a common coordinate system that is shared between a virtual reenactment environment and the environment in the occurring event, to be used as reference for applying the spatial and velocity information from the occurring event to the objects in the virtual environment.

According to a further aspect of the disclosure, it provides an electronic device wherein the electronic device is configured to associate virtual, computer generated objects with spatial and velocity information from the at least one data stream, wherein the spatial and velocity information comprises position coordinates for each object e.g. in a three dimensional coordinate system and/or each objects movement direction and/or velocities of each object in the occurring event.

According to another aspect of the disclosure, it provides an electronic device wherein the electronic device is configured to switch to a reenactment mode in said electronic device, wherein the switching is performed by a user engaging a reenactment activator on either of the electronic device or a remote control device connected to the electronic device.

By providing an electronic device that achieves the above aspects, a fast and accurate way of generating an instant virtual reenactment of an occurring event is achieved. Furthermore, a device that is capable of receiving at least one data stream comprising information regarding the occurring event and associating computer generated objects in the virtual reenactment with the information from the at least one data stream enables the user to instantly switch from viewing an occurring event to a reenactment mode, in which the virtual objects are controllable, by a single action from the user.

BRIEF DESCRIPTION OF THE DRAWINGS

The present invention will be more readily understood through the study of the following detailed description of the embodiments/aspects together with the accompanying drawings, of which:

FIG. 2 is a functional block diagram of exemplary components of a device in which aspects of the invention may be implemented.

DETAILED DESCRIPTION

Figure 1:
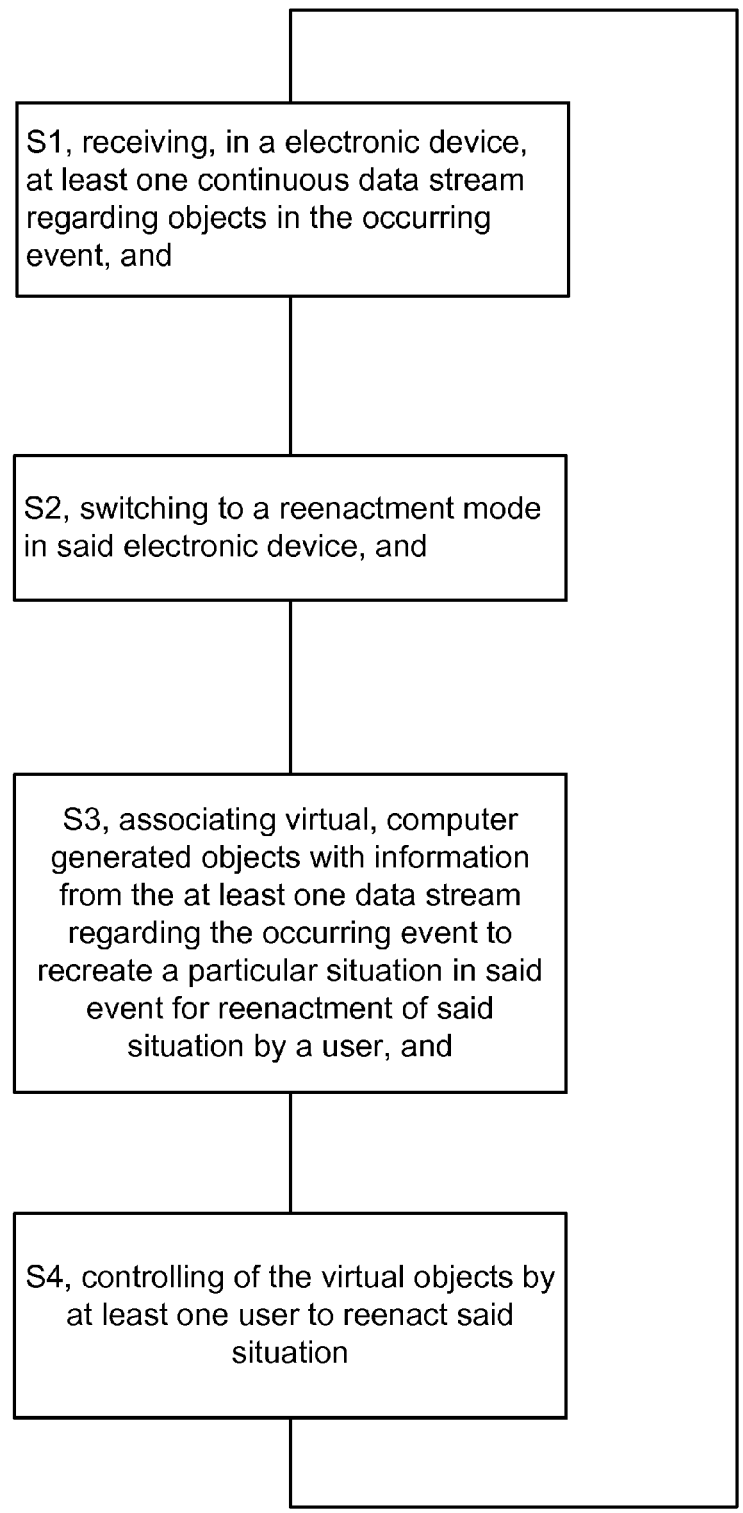
FIG. 1 illustrates a flowchart of the method of generating a virtual reenactment of an occurring event.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

FIG. 1 illustrates a flowchart of the method of generating a virtual reenactment of an occurring event. The first step S1 comprises receiving, in an electronic device, at least one continuous data stream regarding objects, e.g. players and/or ball(s) and/or rackets etc., in the occurring event. The electronic device can be any of a game console, a portable gaming console, a mobile phone, a PDA, a computer or any similar device capable of receiving a data stream. The occurring event can be any of a plurality of different broadcast events e.g. live sports events, e.g. a soccer game, a basketball game etc., or a similar type of broadcast entertainment e.g. a live computer game tournament which environments can be recreated virtually. The data stream can be received via wireless communication e.g. Bluetooth, WLAN, etc., or via conventional wire bound communication. The at least one data stream can in one embodiment comprise image, audio information etc. regarding objects in said occurring event.

In a further embodiment of the present invention, the data stream comprises spatial information, velocity information, audio information, image information etc., regarding the objects in the occurring event wherein the velocity information may further comprise velocity information and/or movement directions regarding the objects in the occurring event.

The electronic device may in one further embodiment be receiving two separate data streams, one comprising spatial and velocity information regarding objects in said occurring event and another data stream comprising image information regarding said occurring event. Furthermore, the electronic device may be arranged to generate a second data stream from a first data stream, where said first data stream only comprises image information regarding said occurring event. The second data stream is generated by an image analysis algorithm which tracks objects in the data stream comprising image information and retrieves spatial and velocity information regarding the objects from said first data stream to create a second data stream comprising only the spatial and velocity information regarding the objects in the first data stream. The velocity information may comprise movement directions regarding the objects in the occurring event. The technique of tracking objects in a moving image is known in the art and will not be described in further detail.

The at least one data stream may be stored in a storage unit that is connected to said electronic device, the storage unit can be an internal unit i.e. part of the electronic device or an external storage unit. The storage unit is capable of storing enough information and has sufficient read and write speeds to store and retrieve information regarding said object in said occurring event. The storing of information is required for the user of the electronic device to be able to track backwards in the data from the at least one data stream to find the particular sequence of events that is to be recreated and reenacted virtually. The at least one data stream can further comprise a time recording that is synchronized with the other information in the at least one data stream, i.e. a recording of the time from start of the occurring event. In one embodiment of the present invention, the storage unit stores the information from the data stream comprising spatial and velocity information regarding the objects in the occurring event. In a further embodiment of the present invention, the storage unit stores the data stream comprising image information regarding the occurring event. In a further embodiment of the present invention, the storage unit stores the said data stream comprising spatial and velocity information and the data stream comprising image information. The information from the at least one data stream is in one embodiment stored in the storage unit temporarily, preferably is 1-2 minutes of information stored to keep the accumulated information stored at a minimum but still allowing the user to track backwards in time to a requested situation. The time the information is stored can also be determined by the user, i.e. if the user chooses to store the data stream comprising spatial and velocity information for a longer time e.g. the entire length of a soccer game or longer he can program the electronic device accordingly in advance.

The second step, S2, comprises switching to a reenactment mode in said electronic device. The switching can be performed by a user engaging a reenactment activator on either of the electronic device or a remote control device connected to the electronic device. The switching to a reenactment mode in said electronic device can also be performed by a first user, that is watching an occurring event, sending a reenactment request to at least one other remote user. The sending of the reenactment request is preferably performed via internet or any other type of network. If the request is accepted by the other user(s), the information regarding the occurring event that is stored in the storage unit connected to the electronic device of the first user is transmitted to the electronic device of the other user(s) for enabling simultaneous reenactment of an occurring event by at least two remote users. It can be sufficient to only transmit time information, i.e. the time in the game, to the other user(s) if said other user(s) is watching the same occurring event with an electronic device that stores at least one data stream regarding said occurring event. The retrieval of information from said data stream can subsequently be accurately performed in each user(s) electronic device by only knowing the time in the game that the first user wants to reenact. The transmitted information can also comprise only the spatial, velocity and team information. This allows only a small amount of information to be transmitted and the other user(s) does not need to have stored the at least one data stream from said occurring event in order to reenact the desired situation in the occurring event.

As an example, the transmitted total amount of data may also be decreased by sending a compressed text file from the first user to the remote user instead of audio and/or video information. Then, the text file at least or only specifies, as an example, the position of the players and the ball. Hence, any computer graphics and/or sound information may be locally stored and "filled-in" by the electronic device, e.g. a game pad, to complement the information in the text file and enabling the simultaneous reenactment of the associated occurring event by the at least one other remote user. This is similar to sending metadata concerning the players and the ball in this event. This has the benefit of short waiting times for the user(s), enabling even no delay, while still maintaining the accuracy in the object placement.

The switching can also be performed automatically if the electronic device determines that a particular situation has occurred in the occurring event, e.g. a scoring of a goal. The determination that a particular situation has occurred can in one embodiment be performed by the tracking system analyzing the objects in the occurring event.

Step three, S3, comprises associating virtual, computer generated objects with information from the at least one data stream with information regarding the occurring event to recreate a particular situation in said event for reenactment of said situation by at least one user. The objects can be e.g. players in a soccer game, the ball etc. The electronic device is adapted to define a coordinate system in reenactment environment that essentially corresponds to a coordinate system in the occurring event. The coordinate systems facilitates the retrieval of the data streams comprising information regarding the objects in the occurring event, i.e. respective objects spatial information, velocity information comprising movement direction can be defined according to said coordinate system to ensure correspondence between the virtual reenactment and the occurring event. In a further embodiment, image information from the occurring event may be used to create a virtual reenactment by automatically generating computer graphic to mimic the image information from the occurring event.

The information in the at least one data stream may also comprise team information regarding the objects in the occurring event that may be associated to the corresponding object in the virtual reenactment. In a further embodiment, the team information may be retrieved by analyzing the data stream comprising image information from said occurring event.

Step four, S4, comprises controlling of the virtual objects by at least one user to reenact said situation. The information from the at least one data stream regarding the occurring event is used to position and orient the virtual objects in the virtual reenactment and to generate the surroundings in the virtual reenactment when at least one user decides to enter the reenactment mode. The information is then imported to a game corresponding to the occurring event, e.g. if the user(s) is watching a live soccer game, the information is imported to a soccer game in the electronic device. Each user may then select a virtual object e.g. a soccer player that he/she chooses to control, however this can be changed during the reenactment. The objects in the virtual reenactment that are not controlled by a user are computer controlled and may be chosen by the user(s) to act according to the information in the data stream i.e. as they did in the live occurring event or to act according to regular computer controlled artificial intelligence.

The user(s) can control the objects in the virtual reenactment by use of any of a remote control; a touch screen on an electronic device, a keyboard connected an electronic device etc.

During the reenactment, the electronic device may be adapted to store at least one data stream with information regarding the occurring event from the time the user(s) enter the reenactment mode until the user(s) decide to resume watching the occurring event again to enable playback of said information from the at least one data stream to the user(s) which allows the user(s) to reenact a situation in the occurring event without having to miss any of the occurring event.

As described above, aspects of the invention may be implemented in an electronic device, such as a game console, a portable gaming console, a mobile phone, a personal digital assistant (PDA), a computer, a laptop, a tablet or any type of device capable of receiving a data stream. FIG. 2 is a diagram illustrating components of an exemplary electronic device 200 (also referred to as user device 200 or system 200) in which aspects of the invention may be implemented. Referring to FIG. 2, user device 200 may include bus 210, processor 220, memory 230, input device 240, output device 250 and communication interface 260. Bus 210 permits communication among the components of user device 200. One skilled in the art would recognize that user device 200 may be configured in a number of other ways and may include other or different elements. For example, user device 200 may include one or more modulators, demodulators, encoders, decoders, etc., for processing data.

Processor 220 may include a processor, microprocessor, an application specific integrated circuit (ASIC), field programmable gate array (FPGA) or other processing logic. Processor 220 may execute software instructions/programs or data structures to control operation of user device 100.

Memory 230 may include a random access memory (RAM) or another type of dynamic storage device that stores information and instructions for execution by processor 220; a read only memory (ROM) or another type of static storage device that stores static information and instructions for use by processor 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processor 220. Instructions used by processor 220 may also, or alternatively, be stored in another type of computer-readable medium accessible by processor 220. A computer-readable medium may include one or more memory devices.

Input device 240 may include mechanisms that permit an operator to input information to user device 200, such as a remote control device (e.g., a television remote control), microphone, a keypad, control buttons, a keyboard (e.g., a QWERTY keyboard, a Dvorak keyboard, etc.), a gesture-based device, an optical character recognition (OCR) based device, a joystick, a touch-based device, a virtual keyboard, a speech-to-text engine, a mouse, a pen, voice recognition and/or biometric mechanisms, etc. In an exemplary implementation, input device 240 may include a touch screen display.

Output device 250 may include one or more mechanisms that output information to the user, including a display (e.g., a television screen or computer monitor screen), a printer, one or more speakers, etc. As described above, in an exemplary implementation, input device 240 may include a touch screen display. In such an implementation, the touch screen display may function as both an input device and an output device.

Communication interface 260 may include a transceiver that enables user device 200 to communicate with other devices and/or systems. For example, communication interface 260 may include a modem or an Ethernet interface to a LAN, a WAN, etc. Communication interface 260 may also include mechanisms for communicating via a network, such as a wireless network. For example, communication interface 260 may include one or more radio frequency (RF) transmitters, receivers and/or transceivers and one or more antennas for transmitting and receiving RF data via a network. Communication interface 260 may also communicate via a wired network (e.g., the Internet), an optical network, a satellite network, etc.

User device 200 may provide a platform for implementing aspects of the invention, such as the processes described above with respect to FIG. 1. User device 200 may perform these operations in response to processor 220 executing sequences of instructions contained in a non-transitory computer-readable medium, such as memory 230. Such instructions may be read into memory 230 from another computer-readable medium via, for example, and communication interface 260. In alternative embodiments, hard-wired circuitry may be used in place of or in combination with software instructions to implement processes consistent with the invention. Thus, implementations described herein are not limited to any specific combination of hardware circuitry and software.

It will also be apparent to one of ordinary skill in the art that aspects of the invention, as described above, may be implemented in computer devices, cellular communication devices/systems, media playing devices/systems, methods, and/or computer program products. Accordingly, aspects of the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an ASIC, an FPGA or other processing logic, software, or a combination of hardware and software.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The invention claimed is:

1. A method for generating an instant virtual reenactment of an occurring event, the method comprising:
   receiving, in an electronic device, a continuous data stream with information regarding objects in the occurring event, wherein the continuous data stream comprises:
   a first data stream that comprises image information; and
   a second data stream that comprises spatial information, wherein the first and second data streams are synchronized;
   storing the second data stream in a storage unit;
   displaying the first data stream to present the occurring event to a user;
   tracking backward in time in the presented occurring event to a user-selected position at which a particular situation started to evolve;
   switching to a reenactment mode in said electronic device;
   associating virtual, computer generated objects with the spatial information from the stored second data stream regarding the particular situation to recreate the particular situation in said occurring event for reenactment of said particular situation by the user, including positioning and orienting the virtual objects in the reenactment according to counterpart objects in the occurring event; and
   controlling of at least one of the virtual objects by the user to reenact said particular situation.

2. The method according to claim 1, wherein the method comprises:
   storing the second data stream for a predetermined period of time.

3. The method according to claim 2, wherein the switching to the reenactment mode is performed by a first user that is watching the occurring event and the switching sends a reenactment request to a remote user, and if the request is accepted by the remote user, the information regarding the occurring event that is stored in the storage unit of the first user is transmitted to the electronic device of the remote user for enabling simultaneous reenactment of the occurring event by the first user and the remote user.

4. The method according to claim 1, wherein the spatial information comprises position coordinates for each object in a three dimensional coordinate system.

5. The method according to claim 1, wherein the method comprises:
   defining a common coordinate system that is shared between a virtual reenactment environment and the environment in the occurring event, to be used as reference for applying the spatial information from the occurring event to the objects in the virtual environment.

6. The method according to claim 1, wherein switching to the reenactment mode is performed by a user engaging a reenactment activator on either of the electronic device or a remote control device that is in communication with the electronic device.

7. The method according to claim 1, wherein the second data stream further comprises velocity information and the associating further associates the virtual, computer generated objects with the velocity information.

8. An electronic device for generating an instant virtual reenactment of an occurring event comprising a processing unit, a thereto connected storage unit, and a network communication device, wherein the electronic device is configured to:
receive, over the network communication device, a continuous data stream with information regarding objects in the occurring event, wherein the continuous data stream comprises:
a first data stream that comprises image information; and
a second data stream that comprises spatial information, wherein the first and second data streams are synchronized;
store the second data stream in the storage unit;
display the first data stream to present the occurring event to a user;
track backward in time in the presented occurring event to a user-selected position at which a particular situation started to evolve;
switch to a reenactment mode in said electronic device;
associate virtual, computer generated objects with the spatial information from the stored second data stream regarding the particular situation to recreate the particular situation in said occurring event for reenactment of said particular situation by the user, including positioning and orienting the virtual objects in the reenactment according to counterpart objects in the occurring event; and
control of at least one of the virtual objects by the user to reenact said particular situation.

9. The electronic device according to claim 8, wherein the electronic device is a mobile electronic device, a gaming device or a computer.

10. The electronic device according to claim 8, wherein the electronic device is configured to store the second data stream for a predetermined period of time.

11. The electronic device according to claim 8, wherein the electronic device is configured to:
define a common coordinate system that is shared between a virtual reenactment environment and the environment in the occurring event, to be used as reference for applying the spatial information from the occurring event to the objects in the virtual environment.

12. The electronic device according to claim 8, wherein the switching to the reenactment mode is performed by a user engaging a reenactment activator on either of the electronic device or a remote control device that is in communication with the electronic device.

13. The electronic device according to claim 8, wherein the second data stream further comprises velocity information and the associating further associates the virtual, computer generated objects with the velocity information.

14. The electronic device according to claim 13, wherein the spatial and velocity information comprises position coordinates for each object in a three dimensional coordinate system, each object's movement direction, and velocities of each object in the occurring event.

* * * * *